(12) United States Patent
Warkotsch (10) Patent No.: US 7,941,933 B2
(45) Date of Patent: May 17, 2011

(54) CLAMPING DEVICE

(75) Inventor: Dirk Warkotsch, Burgwedel (DE)

(73) Assignee: Haweka AG, Burgwedel (DE)

( * ) Notice: Subject to any disclaimer, the term of this patent is extended or adjusted under 35 U.S.C. 154(b) by 0 days.

(21) Appl. No.: 12/529,627

(22) PCT Filed: Mar. 3, 2008

(86) PCT No.: PCT/EP2008/001662
§ 371 (c)(1),
(2), (4) Date: Sep. 2, 2009

(87) PCT Pub. No.: WO2008/107143
PCT Pub. Date: Sep. 12, 2008

(65) Prior Publication Data
US 2010/0101736 A1    Apr. 29, 2010

(30) Foreign Application Priority Data

Mar. 2, 2007 (DE) .......................... 10 2007 010 629
Mar. 22, 2007 (DE) .......................... 10 2007 014 479

(51) Int. Cl.
*G01M 1/04* (2006.01)
*G01B 5/255* (2006.01)
*G01D 21/00* (2006.01)
(52) U.S. Cl. ........................................ 33/203; 33/203.18
(58) Field of Classification Search .................... 33/203, 33/203.18, 203.19, 203.2
See application file for complete search history.

(56) References Cited

U.S. PATENT DOCUMENTS

| | | | | |
|---|---|---|---|---|
| 2,531,799 A * | 11/1950 | Zumwalt | ......................... | 248/201 |
| 3,488,857 A * | 1/1970 | Bateman | .................... | 33/203.18 |
| 3,916,971 A | 11/1975 | Carpenter et al. | | |
| 4,285,136 A * | 8/1981 | Ragan | ......................... | 33/203.18 |
| 4,625,385 A * | 12/1986 | Kohler et al. | .................... | 29/467 |
| 4,918,821 A * | 4/1990 | Bjork | ......................... | 33/203.18 |

(Continued)

FOREIGN PATENT DOCUMENTS

DE    26 16 945 A1    10/1977

OTHER PUBLICATIONS

International Search Report for PCT/EP2008/001662.

*Primary Examiner* — Christopher W Fulton
(74) *Attorney, Agent, or Firm* — Roberts Mlotkowski Safran & Cole, P.C.; David S. Safran (57) ABSTRACT

A clamping device for mounting a vehicle wheel on a balancing machine. The clamping device has a clamping flange and a plurality of centering bolts. The clamping flange is provided with plural sets of recesses for the centering bolts. An insertable section of each centering bolt is removably insertable into a recess. A profiled contour in the insertable section of the centering bolt and an inner contour of a sidewall of the clamping flange delimiting the recess are not circular and have complementary shapes such that the centering bolt is accommodated in the recess such that some sections of the centering bolt can be rotated about the longitudinal axis thereof. When the centering bolt is rotated, at least one subarea of a circumferential surface in the insertable section of the centering bolt frictionally engages with at least one adjacent subarea of the sidewall of the clamping flange delimiting the recess.

12 Claims, 9 Drawing Sheets

U.S. PATENT DOCUMENTS

| | | | |
|---|---|---|---|
| 5,339,508 A * | 8/1994 | Ventress | 29/273 |
| 5,665,911 A | 9/1997 | Warkotsch | |
| 6,055,735 A * | 5/2000 | Weihrauch et al. | 33/203 |
| 6,138,366 A * | 10/2000 | Boess | 33/203.18 |
| 6,282,799 B1 * | 9/2001 | Warkotsch | 33/203.18 |
| 7,010,975 B2 | 3/2006 | Oppermann et al. | |
| 7,174,646 B2 * | 2/2007 | Corghi | 33/203.18 |
| 7,178,880 B2 | 2/2007 | Andersen | |
| 7,353,610 B2 | 4/2008 | Gerdes et al. | |

\* cited by examiner

CLAMPING DEVICE

BACKGROUND OF THE INVENTION

1. Field of Invention

The invention relates to a clamping device for clamping a vehicle wheel onto a shaft of a wheel balancing machine, with a clamping flange and with a plurality of centering bolts, wherein the clamping flange has a plurality of recesses for receiving the centering bolts, and wherein each centering bolt can be inserted releasably by means of an insertion region into a recess. Furthermore, the present invention relates to a clamping flange and a centering bolt, each designed for use in a clamping device of the abovementioned type.

2. Description of Related Art

A clamping device of the abovementioned type is known, for example, from European Patent Application EP 0 738 885 A2 and corresponding U.S. Pat. No. 5,665,911 and serves to clamp wheels of different types of motor vehicles onto a shaft of a wheel balancing machine. The known clamping device has a central guide bore in the clamping flange for axially guiding the clamping flange on the shaft of the wheel balancing machine and is provided with at least two groups, arranged in the clamping flange, of axially parallel centering bores which are arranged on various circles of different diameter and/or in a different number and at the same circumferential distance. In this case, the arrangements of holes correspond to the arrangement of holes in the rims of wheels of different types of motor vehicles. In addition, the known clamping device has centering bolts which can be inserted into the centering bores of the clamping flange and at the free ends of which centering cones are provided.

In order to clamp a vehicle wheel onto the shaft of the wheel balancing machine, the centering bolts are, first of all, inserted into a group of bores in the clamping flange, the arrangement of the bores corresponding to the arrangement of holes in the rim of a wheel to be clamped. The wheel is then pushed with the rim onto the shaft of the wheel balancing machine until the rim bears against a stop part mounted on the shaft. In the process, the stop part engages in the central hole in the rim of the wheel to be clamped. The clamping flange is then pushed by the central guide bore onto the shaft of the wheel balancing machine until the centering cones of the centering bolts engage in the fastening holes in the rim of the wheel. A clamping nut is subsequently screwed onto a thread provided on the shaft of the wheel balancing machine until the rear side of the rim comes to bear against a bearing flange of the shaft of the wheel balancing machine. The rim is oriented as a result in a plane perpendicular to the axis of the wheel balancing machine. The centering cones of the centering bolts, which centering cones engage in the centering holes of the rim, bring about a radial centering, with the clamping flange contributing to preventing the occurrence of a dynamic unbalance during the wheel balancing operation.

In order to clamp a different type of vehicle wheel, the centering bolts have to be pulled out of the centering bores in the clamping flange and inserted into a different group of centering bores in the clamping flange, the arrangement of which centering bores corresponds to the arrangement of centering holes in the rim of the new type of wheel. The centering bolts and the corresponding bores in the clamping flange have to be manufactured with a high degree of precision in order to ensure, in a substantially play-free manner, a satisfactory installation of the vehicle wheels which are to be balanced.

In order to secure the centering bolts on the clamping flange from falling out, which can be attributed in particular to the wear of the bolt holders during a progressive period of use of the known clamping device, the ends of the centering bolts on the side of the insertion region generally have a rubber ring which, after the bolt end has been inserted through the centering bore, expands on the rear side of the clamping flange and therefore prevents the bolt from falling out. This manner of fixing the centering bolts on the clamping flange ensures a sufficient holding force of the bolts on the clamping flange. A disadvantage in this case is that some of the centering bolts can only be inserted into the centering bores with a considerable amount of effort. It has to be ensured that each centering bolt emerges at its end having the rubber ring on the rear side of the clamping flange such that the rubber ring can expand. In order to pull the bolt out, it then has to be pulled out of the bore counter to the holding force of the rubber ring, which in turn requires a corresponding amount of effort. If the bolts are not moved for a relatively long period of time, the centering bolts may furthermore become stuck in the centering bores, which results in an increased effort being needed to pull the bolts out of the centering bores.

Furthermore, a clamping device of the type mentioned at the beginning is known from German Patent Application DE 103 31 129 A1 and corresponding U.S. Pat. No. 7,010,975 B2. In this known clamping device, centering bolts are likewise provided, said bolts being fixed releasably in a group of recesses in a clamping flange corresponding to the arrangement of holes in a rim of a wheel to be clamped onto a shaft of a wheel balancing machine. In order to reduce centering errors and/or unbalance errors due to play between the centering bolts and the clamping flange, for example due to manufacturing tolerances or wear, the centering bolt has an elastically deformable circumference which, in a functional position, bears against a wall surface of the clamping flange, the wall surface bounding the recess. The circumference can be deformed both hydraulically and mechanically. This creates the possibility of compensating for the play between the centering bolt and the clamping flange due to manufacturing tolerances and inaccuracies during the production of the centering bolts and of the recesses in the clamping flange and of therefore reducing centering errors during the clamping operation and of wheel balancing errors during the balancing of the vehicle wheel. Wear to the bolt or to the clamping flange that results from use can also be compensated for by readjusting or adapting the circumference of the centering bolt to the associated recess in the clamping flange. A securing ring also prevents the release here of the bolt from the clamping flange, which results in the above-described disadvantages. Furthermore, the deformation of the circumference of the centering bolt is structurally complicated and associated with high production costs. The insertion region of the centering bolt is also drilled to be hollow, thus significantly reducing the component strength of the centering bolts.

SUMMARY OF THE INVENTION

It is the object of the present invention to provide a clamping device of the type mentioned at the beginning which makes it possible, in a simple manner, for the centering bolts to be fastened to the clamping flange and for the centering bolts to be released later from the clamping flange, with a centered arrangement of the centering bolts in the recesses being ensured even after a relatively long period of use of the clamping device. Furthermore, the clamping device according to the invention is to be distinguished by a high component strength.

The abovementioned objects are achieved in the case of a clamping device of the type mentioned at the beginning in that a profile contour of the centering bolt in the insertion region and an inner contour of a side wall of the clamping flange, the side wall bounding the recess, are not circular, and are designed in a complementary manner with respect to each other such that, after inserting into a recess, portions of the centering bolt are held rotatably about the longitudinal axis thereof in the recess, the rotation of the centering bolt about the longitudinal axis thereof resulting in the formation of a frictional connection between at least one surface portion of a circumferential surface of the centering bolt in the insertion region and at least one adjacent surface portion of the side wall of the clamping flange, the side wall bounding the recess.

In the invention, neither the centering bolt in the insertion region nor the recesses in the clamping flange have a circular contour. Instead, the contours are selected in such a manner that the circumferential surface of the centering bolt in the insertion region and the adjacent circumferential surface of the side wall of the clamping flange in the region of the recess are designed as interacting run-on surfaces or run-on slopes which, by rotation of the centering bolt about the longitudinal axis thereof, enter into mutual engagement and ensure a frictional connection, which acts in the axial and circumferential directions, between the centering bolt and the clamping flange after a predetermined angle of rotation has been reached. The frictional connection applies a sufficiently large holding force which, upon highly precise centering, fixes the centering bolt within the recess on the clamping flange. It is nevertheless possible, by simple rotating back with little effort, to release the frictional connection again and remove the centering bolt from the recess. Furthermore, the fixing of the centering bolt on the clamping flange by means of interacting run-on surfaces or run-on slopes is structurally simple and does not result in a weakening of the component strength of the centering bolt and/or of the clamping flange.

Furthermore, the profile contour of the centering bolt in the insertion region and the profile contour of the recess are matched to each other in such a manner that, when the centering bolt is inserted and subsequently rotated into a closure position, the centering bolt is automatically centered in the recess. As a result, the centered arrangement of the centering bolt in a recess is ensured without the centering bolt having to be adjusted manually.

Corresponding profile contours can be produced in a simple manner, for example by means of percussive machining of bores. However, the profile shape of the bolt and the shape of the inner contour of the side wall of the clamping flange are not definitively defined. Of concern only is that the profile contour of the centering bolt and the inner contour of the side wall of the clamping flange in the region of the recess permit the centering bolt to be centered and gripped in the recess by rotation of the centering bolt in the recess by a certain angle of rotation. Furthermore, the interacting profiles should be selected in such a manner that, upon repeated screwing down and unscrewing of the centering bolt in the recess, the wear on the interacting surface portions is as small as possible. In this connection, the contact surfaces between the centering bolt and the clamping flange in the gripping state are to be as large as possible in order to ensure a low surface pressure.

In order to ensure a satisfactory function over a relatively long period of use in spite of the increasing wear of those surface portions of the centering bolt and of the clamping flange which participate in the formation of a frictional connection, the profile contour of the centering bolt in the insertion region and the inner contour of the side wall of the clamping flange in the region of the recess are preferably designed in a manner such that they are complementary to each other such that the angle of rotation of the centering bolt in the recess required in order to form a frictional connection is dependent on the state of wear of the surface portions forming the frictional connection between the bolt and clamping flange. The required angle of rotation about which the centering bolt has to be rotated in the recess in order to be able to enter into a frictional connection with the clamping flange is predetermined by the complementary contours. Due to wear, the surfaces of the centering bolt and/or of the clamping flange become worn down, the increasing abrasion causing the centering bolt to have to be rotated more powerfully in order to form a frictional connection between the centering bolt and the clamping flange. The angle of rotation of the centering bolt in a new state of the clamping device should preferably correspond to approximately half the maximum possible angle of rotation for forming a frictional connection in a state of wear of the clamping device. As a result, despite increasing wear, the formation of a frictional connection can be ensured, it being necessary, depending on the corresponding wear of the contact surfaces, to rotate the centering bolt about an angle which is greater than the maximum possible angle of rotation in the new state.

The inner contour of the clamping flange in the region of the recess can have a plurality of arc portions following one another in the circumferential direction, the distance between the center point of the recess and at least two points on the inner contour of the side wall of the clamping flange, which points are spaced apart from each other in the circumferential direction of an arc portion, differing in size. At least one contour portion has to be provided with a distance changing in the circumferential direction from the center point of the recess so that the formation of a frictional connection between the centering bolt and the clamping flange is possible at all. If the inner contour of the side wall of the clamping flange in the region of a recess has a plurality of consecutive arc portions, then, when the frictional connection is achieved, there is preferably surface contact in the region of each arc portion. In order to keep the surface pressure and therefore the abrasion low here, in a preferred embodiment of the invention, three arc portions are provided, the arc portions forming the inner contour of the clamping flange in the region of the recess. It goes without saying that, however, two or else more than three arc portions may also be provided in order to provide corresponding interacting run-on surfaces. The profile contour of the centering bolt in the insertion region has to be correspondingly adapted.

In a preferred embodiment, the distance between the center point of the recess and the inner contour of the side wall of the clamping flange decreases continuously in a circumferential direction over the length of an arc portion from a starting point on the inner contour with a greatest distance from the center point of the recess in the region of a beginning of an arc as far as an end point on the inner contour with a smallest distance from the center point of the recess in the region of an end of the arc. When the centering bolt is inserted into a recess, a relative movement between the centering bolt and the clamping flange is therefore possible in the recess. When the centering bolt is rotated in the one circumferential direction, the play existing between the centering bolt and the clamping flange decreases until a frictional connection between at least one surface portion of a circumferential surface of the centering bolt and at least one adjacent surface portion of the side wall or inner wall of the clamping flange, which wall bounds the recess, occurs. For simplified insertion of the centering bolt into a recess, the distance between the center point of the recess and the inner contour can increase continuously from a beginning point of the arc portion in the direction of the starting point.

If the side wall of the clamping flange, which side wall bounds the recess, has an inner contour with a plurality of arc portions following one another in the circumferential direction, all of the arc portions are preferably of identical design such that, when the centering bolt is inserted into the recess and subsequently rotated into the frictional connection position, the centering bolt is automatically centered in the recess. Furthermore, the production of a certain inner contour is simplified. It can be provided in this connection that the end point of a first arc portion and the beginning point of a second arc portion following in the circumferential direction are at the same (minimum) distance from the center point of the recess. The end point of the first arc portion and the beginning point of the second arc portion preferably merge steplessly into each other.

If each arc portion in the region between the starting point and the end point of the arc, in which the distance between the center point of the cutout and the inner contour changes continuously, is designed as a circular arc, then the center point of the circular arc of a first arc portion and the center point of a circular arc of a further arc portion following in the circumferential direction are offset in the horizontal and vertical directions with respect to each other and offset with respect to the center point of the recess. This results in the distance between the center point of the recess and the inner contour of the side wall of the clamping flange in the region of the recess continuously changing in the circumferential direction from the starting point as far as the end point of the arc portion, namely increasing in the one circumferential direction and decreasing in the other circumferential direction, such that, when the centering bolt is rotated in the recess, a frictional connection occurs or the frictional connection is undone when a predetermined angle of rotation is reached.

The insertion region of the centering bolt can preferably have a polygonal profile, in particular the profile of a three-sided triangle with rounded corners or of a square with rounded corners. If the profile of a three-sided triangle with rounded corners is provided, the inner contour of the side wall of the clamping flange is composed of three arc portions, with a frictional connection between the centering bolt and the clamping flange being formed in the region of each arc portion when the designated angle of rotation is reached. The same applies correspondingly to the situation in which the insertion region of the centering bolt is designed as a square profile with rounded corners, the inner contour being formed by four arc portions following one another in the circumferential direction. It goes without saying that the insertion region of the centering bolt can also have the profile of an ellipse or a rectangular profile with rounded transverse sides, with it being possible for the inner contour of the side wall of the clamping flange, which inner contour bounds a recess, to be accordingly formed from two arc portions.

In another embodiment of the invention, the profile contour of the centering bolt in the insertion region has a plurality of arc portions following one another in the circumferential direction of the centering bolt, and the arc portions of the profile contour of the centering bolt are formed in a complementary manner to the arc portions of the inner contour of the side wall of the clamping flange in the region of the recess. This ensures a large contact surface between the centering bolt and the clamping flange in the region of the recess in the frictional connection position, which contributes to a correspondingly low surface pressure and therefore to low wear.

In detail, there is a multiplicity of options for designing the clamping device according to the invention, as will be apparent from the detailed description below of a preferred exemplary embodiments of the invention with reference to the accompanying drawings.

DETAILED DESCRIPTION OF THE INVENTION

Figure 1:
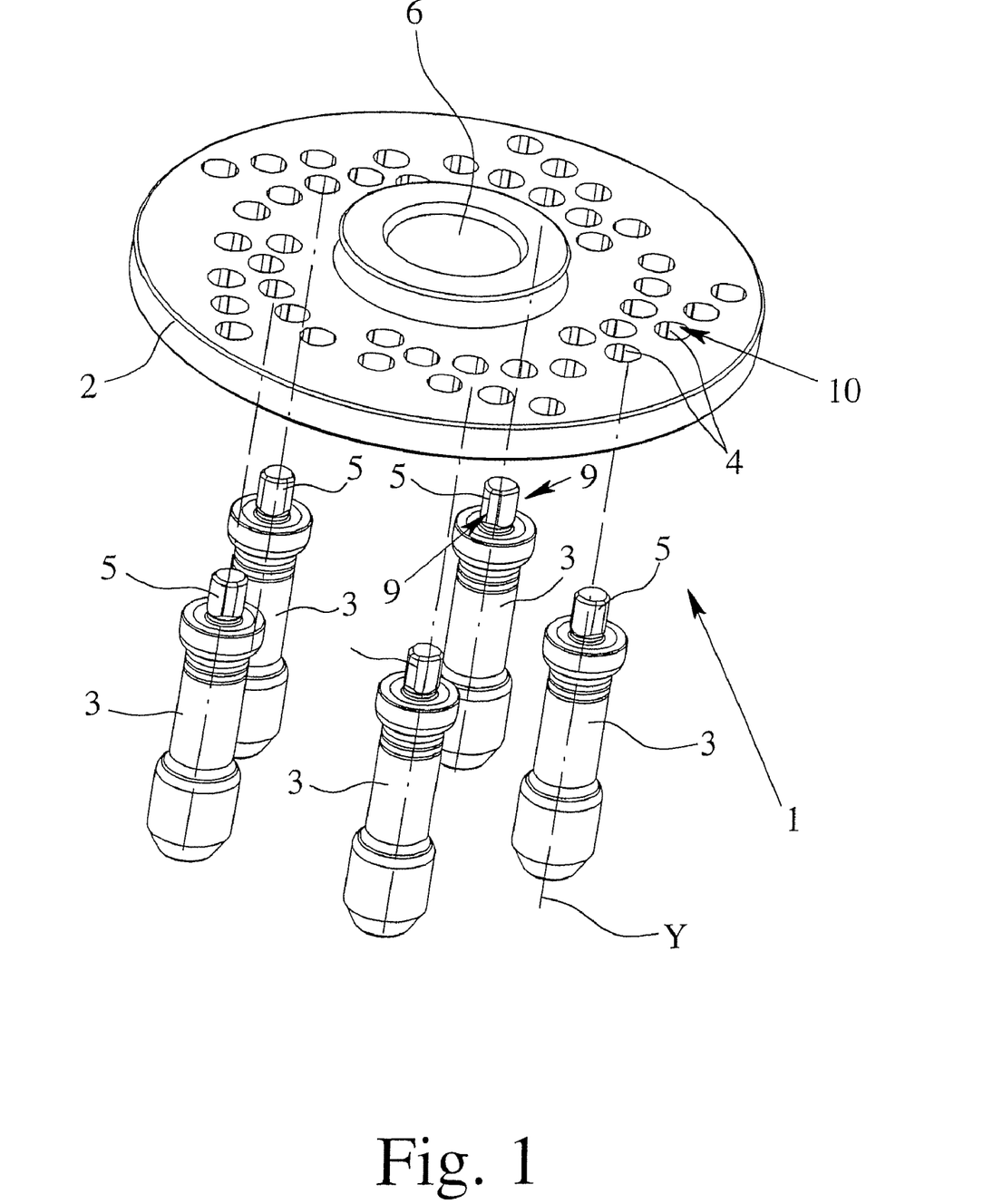
FIG. 1 is an exploded view of a first embodiment of a clamping device according to the invention with a clamping flange and five centering bolts.

FIG. 1 illustrates a clamping device 1 for clamping a vehicle wheel (not illustrated) onto a shaft of a wheel balancing machine, said clamping device having a clamping flange 2 and a plurality of centering bolts 3. The clamping flange 2 has a plurality of recesses 4 for receiving the centering bolts 3, a centering bolt 3 being releasably insertable by means of an insertion region 5 into a recess 4. The centering bolts 3 are fixed releasably into a group of recesses 4 corresponding to the arrangement of holes in the rim of the vehicle wheel to be clamped. The vehicle wheel is centered radially during the wheel balancing operation by means of the centering bolts 3 which engage in the centering or fastening holes of the rim of the vehicle wheel. The clamping flange 2 has a central aperture 6 which makes it possible to push said clamping flange onto the shaft of the wheel balancing machine.

Figures 2, 3A:
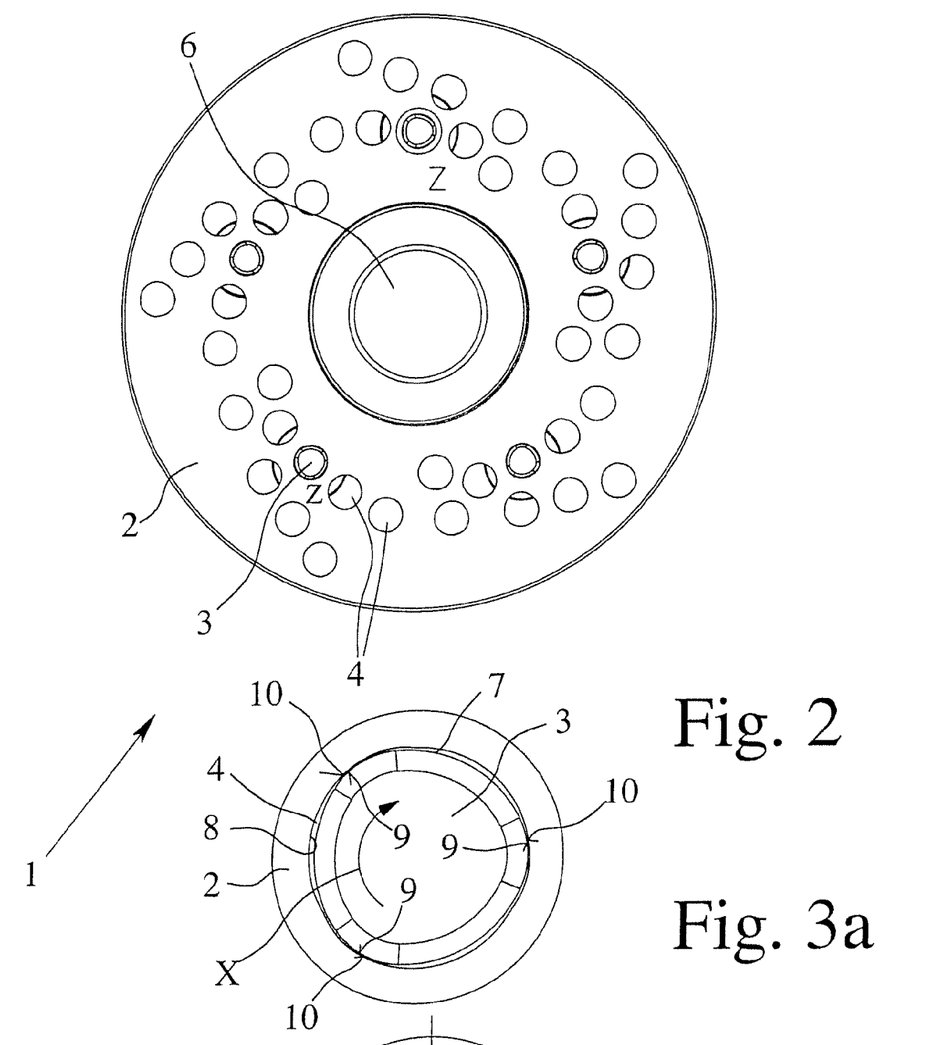
FIG. 2 is a view from below of the clamping device illustrated in FIG. 1 with centering bolts inserted.
FIG. 3a is an illustration of the detail Z in FIG. 2 with a bolt inserted into a recess of the clamping flange.
Figure 3B:
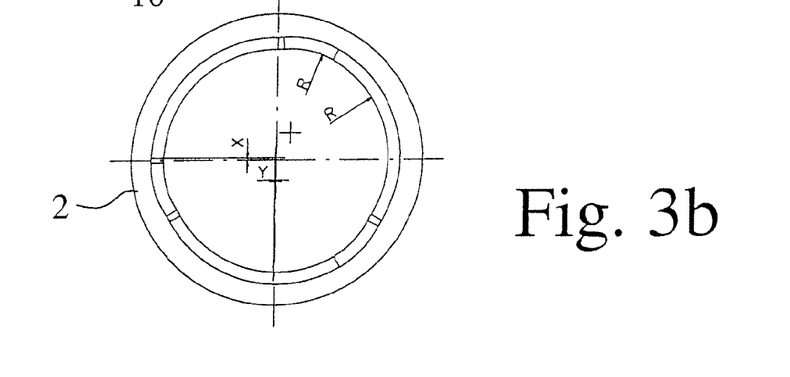
FIG. 3b is a view from above of the inner contour of the recess illustrated in FIG. 3a, FIG. 4 shows a clamping flange of a further embodiment of a clamping device according to the invention in a view from above.

FIG. 2 illustrates a view from below of the clamping device 1 illustrated in FIG. 1, the centering bolts 3 having been inserted by means of the insertion regions 5 into a group of recesses 4 in the clamping flange 3. FIG. 3a illustrates the detail Z in FIG. 2, the centering bolt 3 being in a frictional connection position. FIG. 3b illustrates an inner contour of the recess, which is illustrated in FIG. 3a, in a view from above of the clamping flange 2.

For the fastening to the clamping flange 2, the centering bolt 3 has a non-circular profile contour 7 in the insertion region 5, said contour being a polygonal profile in the embodiment illustrated. The inner contour 8 of a side wall or inner wall of the clamping flange 2, which inner contour bounds a recess 4, is likewise not of circular design. In this case, the profile contour 7 and the inner contour 8 are designed in a complementary manner with respect to each other such that, after insertion into a recess 4, portions of the centering bolt 3 are held rotatably, i.e., about a predetermined angle of rotation, about the longitudinal axis Y thereof in the recess 4, and that, upon rotation of the centering bolt 3 about the longitudinal axis Y thereof, a frictional connection with the clamping flange 2 is formed. In this case, a frictional connection is formed between the centering bolt 3 and the clamping flange 2 in the region of the surface portions 9 of the circumferential surface of the centering bolt 3 and adjacent surface portions 10 of the inner wall of the clamping flange 2, which inner wall bounds the recess 4.

The surface portions 9 which enter into contact with the surface portions 10 of the clamping flange 2 when the centering bolt 3 is rotated in the recess 4 are located in the region of the rounded corners of the insertion region 5 which is designed as a polygonal profile. As furthermore emerges from FIG. 3a, it is possible, by rotating the centering bolt 3 back counter to the circumferential direction X, to undo the frictional connection again between the centering bolt 3 and the clamping flange 2, in which case the surface portions 9 of the centering bolt 3 and the surface portions 10 of the clamping flange 2 come out of contact with one another. By means of the predetermined profile contour 7 of the centering bolt 3 in the insertion region 5 and the inner contour 8 of the side wall of the clamping flange 2 in the region of the recess 4, after the centering bolt 3 is inserted and subsequently rotated into the frictional connection position, the centering bolt 3 is therefore gripped in the recess 4 and at the same time centered.

A crucial factor for the gripping and centering function is for portions of the distance between the center point of the recess 4 and the inner contour 8 of the side wall of the clamping flange 2 to change in the circumferential direction X. The inner contour 8 is formed by arc portions, the center points of which are offset in relation to one another and also with respect to the center point of the recess 4. This is illustrated schematically in FIG. 3b and is explained in detail with reference to FIG. 6.

The surface portions 9 of the centering bolt 3 and the surface portions 10 of the clamping flange 2 interact in the manner of run-on surfaces, wherein, as the centering bolt 3 is increasingly rotated in the recess 4, there is a reduction in the play between a surface portion 9 of the centering bolt 3 and a surface portion 10 of the clamping flange 2 until the frictional connection is reached. In the frictional connection position, there is consequently a frictional connection only between the surface portions 9 of the circumferential surface of the centering bolt 3 and the surface portions 10 of the inner wall of the clamping flange 2, which inner wall bounds the recess 4.

Figure 4:
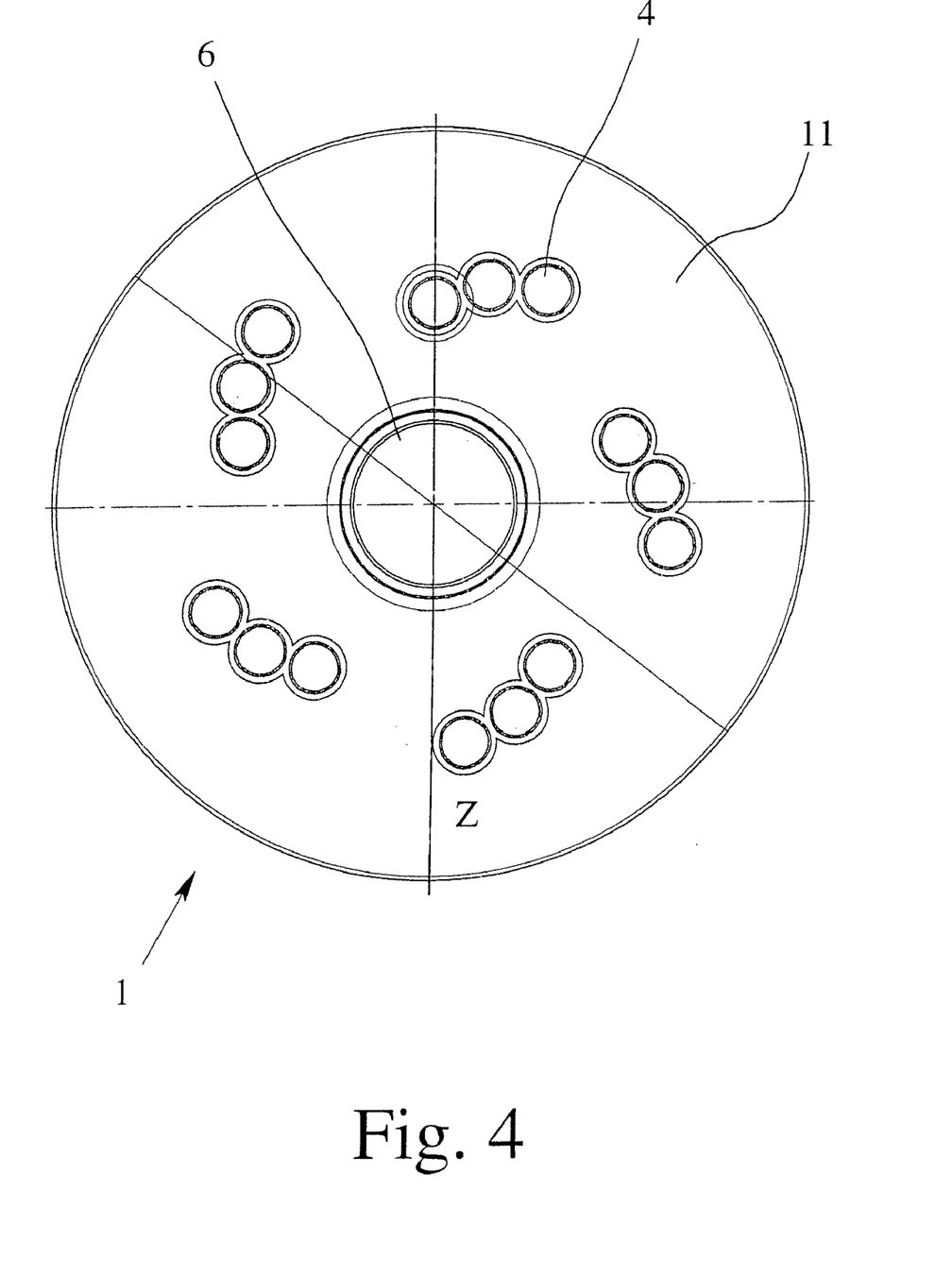
Figure 5:
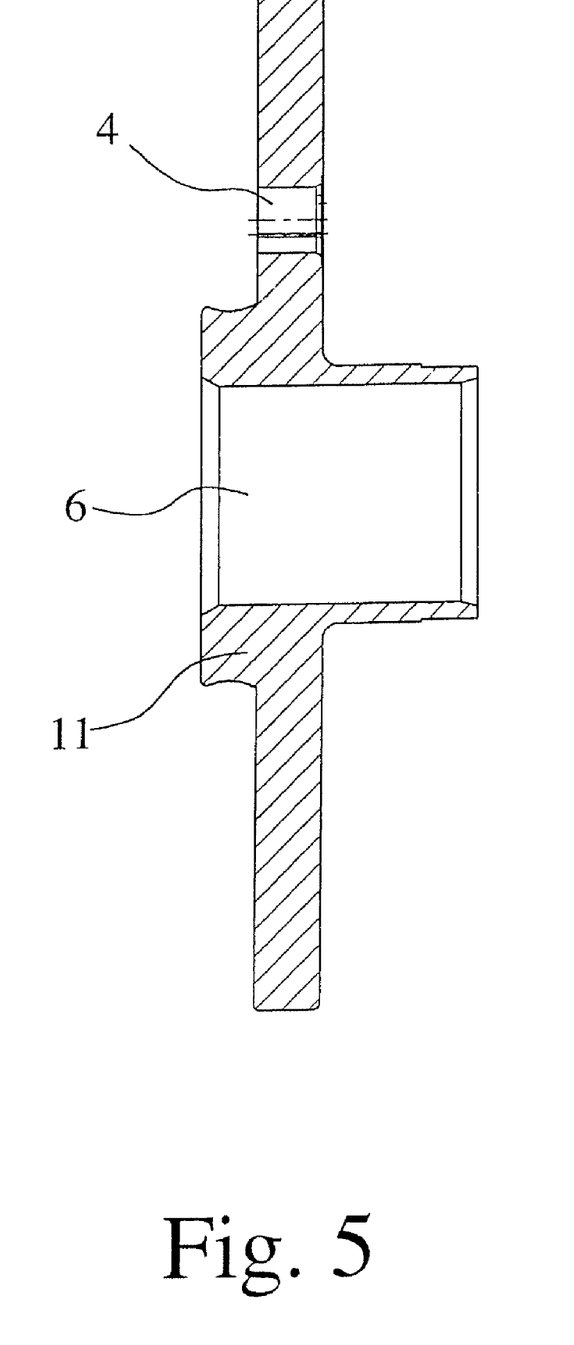
FIG. 5 is a side view of the clamping flange illustrated in FIG. 4.

FIG. 4 illustrates a clamping flange 11 of a further embodiment of a clamping device 1. The clamping flange 11 has a plurality of recesses 4 and a central aperture 6. The edges of the clamping flange 11 are bevelled in the region of the recesses 4. A cross-sectional view of the clamping flange 11 is illustrated in FIG. 5.

Figure 6:
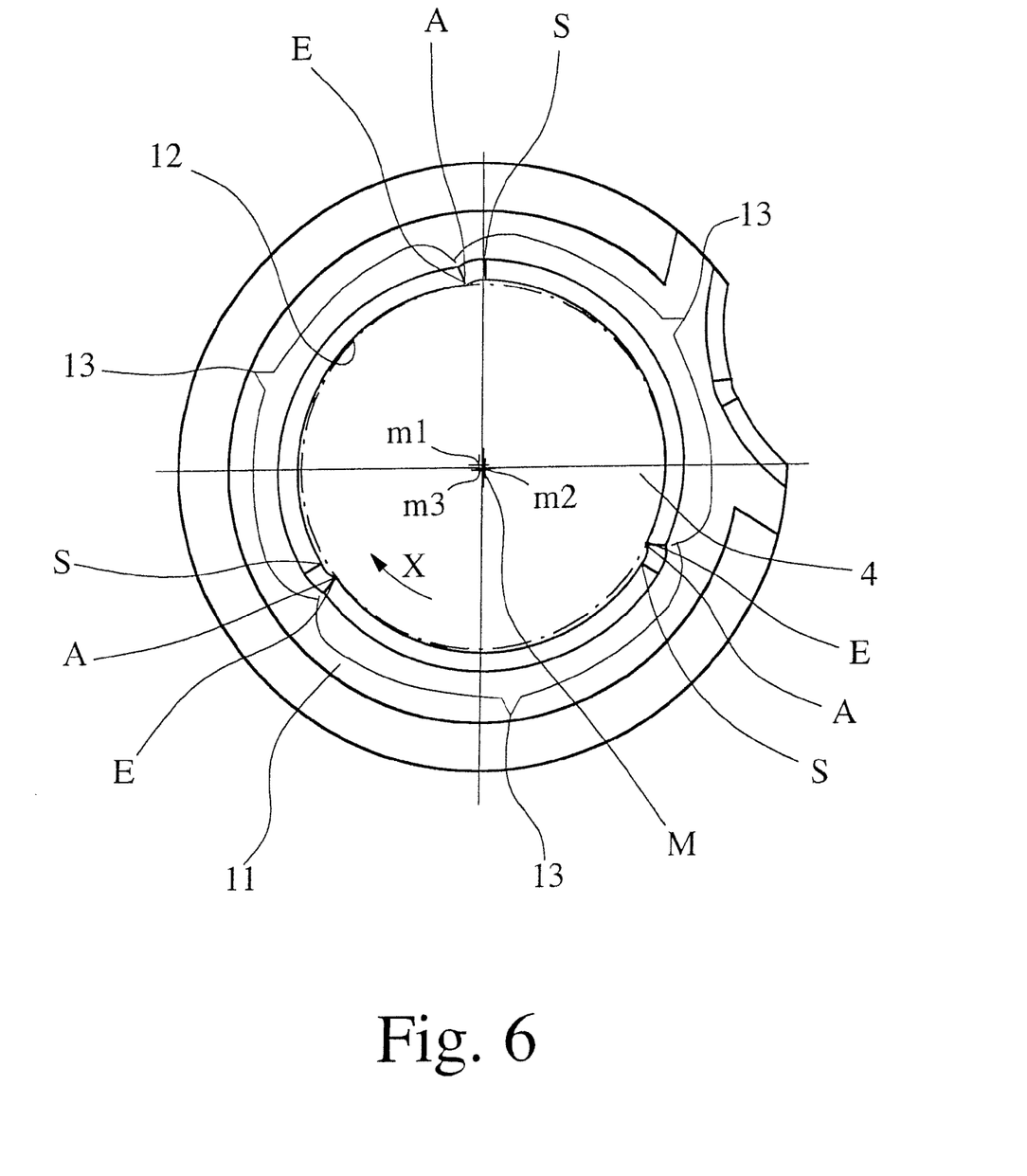
FIG. 6 shows the detail Z in FIG. 4.

FIG. 6 shows the detail Z from FIG. 4. The inner contour 12 of the side wall of the clamping flange 11, the inner contour bounding a recess 4, is again not of circular design but rather is formed by a plurality of arc portions 13 following one another in the circumferential direction X, the distance between the center point M of the recess 4 and the inner contour 12 of the clamping flange 2 decreasing continuously in the circumferential direction X over the length of an arc portion 13 from a starting point S on the inner contour 12 at a greatest distance from the center point M of the recess 4 in the region of a beginning of the arc of the arc portion 13 as far as an end point E on the inner contour 12 with a smallest distance from the center point M of the recess 4 in the region of an end of the arc of an arc portion 13. If a centering bolt 3 is inserted by means of the insertion region 5 into the recess 4, owing to the distance, which decreases in the circumferential direction X, between the center point M of the recess 4 and the inner contour 12 of an arc portion 13, a frictional connection between the centering bolt 3 and the clamping flange 2 is formed, to be precise, in the region of each arc portion 13. In this case, the inner contour 12 of the clamping flange 2 is formed by three arc portions 13 having an identical arc profile. This results in a centering of the centering bolt 3 in a recess 4 as said bolt is being turned into the frictional connection position.

In order to simplify the insertion of the centering bolt 3 into a recess 4 by means of the insertion region 5, the distance between the center point M of the recess 4 and the inner contour 12 of the clamping flange 2 increases continuously from a beginning point A of an arc portion 13 in the direction of the starting point S. The transition between the end point E of a first arc portion 13 and the beginning point A of a second arc portion 13 following in the circumferential direction X is at the same distance from the center point of the recess 4 such that the transition between following arc portions 13 is stepless.

As is also apparent from FIG. 6, each arc portion 13 is designed as a circular arc portion in the region between the starting point S and the end point E, the center points m1, m2, m3 of the circular arc portions of the arc portions 13 following one another in the circumferential direction being offset with respect to one another and offset with respect to the center point M of the recess 4. The gripping and centering function is ensured by the arc portions 13 which are offset with respect to one another. The basic principle is based on the fact that the inner wall of the clamping flange 11 in the region of a recess 4 and the outer wall of the centering bolt 3 in the insertion region 5 do not run parallel in the circumferential direction X when the centering bolt 3 is arranged centrally in the recess 4. The play between the centering bolt 3 and the inner wall of the clamping flange 2, which inner wall defines the inner contour 12 of the clamping flange 2, in the region of a recess 4, decreases at least in portions in the circumferential direction X such that a frictional connection occurs when the bolt 3 is rotated.

In the region between the beginning point A and the starting point S, the arc portion 13 is likewise designed as a circular arc portion, but has a different circular arc radius than in the region between the starting point S and the end point E.

Figure 7:
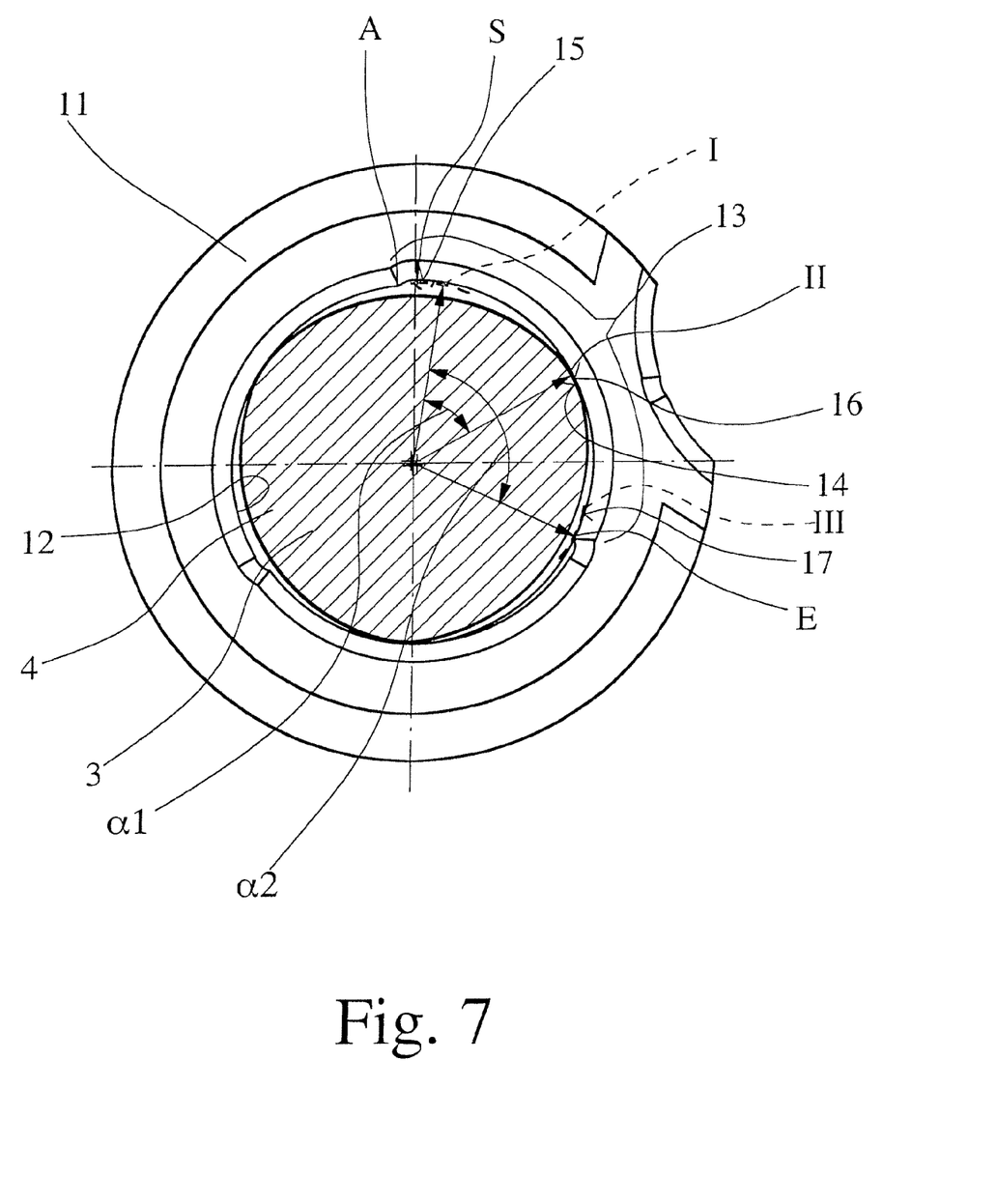
FIG. 7 shows the detail Z of FIG. 4 with an inserted centering bolt having a polygonal profile in the frictional connection position, the centering bolt being illustrated in sectioned form.

FIG. 7 shows the detail Z from FIG. 4 with a centering bolt 3 inserted into the recess 4. FIG. 6 and FIG. 7 show illustrations of the clamping flange 11 from above, the centering bolt 3 being illustrated in sectional form in FIG. 7. In the position identified by I, the centering bolt 3 is in the insertion position, there being play between a surface portion 14 of the centering bolt 3 and a surface portion 15 of an inner wall of the clamping flange 2. This applies to all three arc portions 13. After the centering bolt 3 has been rotated by an angle α1, the centering bolt 3 passes into a frictional connection position II in which the surface portion 14 comes to grip a surface portion 16 of the inner wall of the clamping flange 2. The surface portion 16 lies in the central region of approximately half the arc length of an arc portion 13 between the starting point S and the end point E. Wear of the surface portions 14 of the centering bolt 3 and/or of the surface portions 16 of the clamping flange 2 means that the centering bolt 3 has to be rotated through a greater angle of rotation such that gripping occurs. If the centering bolt 3 is in the further frictional connection position, which is identified by III, the maximum angle of rotation α2 is reached, which is the case in the state of wear of the centering bolt 3 and/or of the clamping flange 2. In the frictional connection position III, there is a frictional connection in each arc portion 13 between the surface portion 14 of the centering bolt 3 and a surface portion 17 of the clamping flange 2 in the region of the end of the arc of the arc portion 13 in question. The angle of rotation α1 in the new state is preferably approximately half of the maximum possible angle of rotation α2 in the state of wear. As a result, in the new state of the clamping device 1, gripping occurs after approximately half the arc length of an arc portion 13 is reached, the gripping location being shifted in the direction towards the end point E of an arc portion 13 as the wear progresses.

Figure 8:
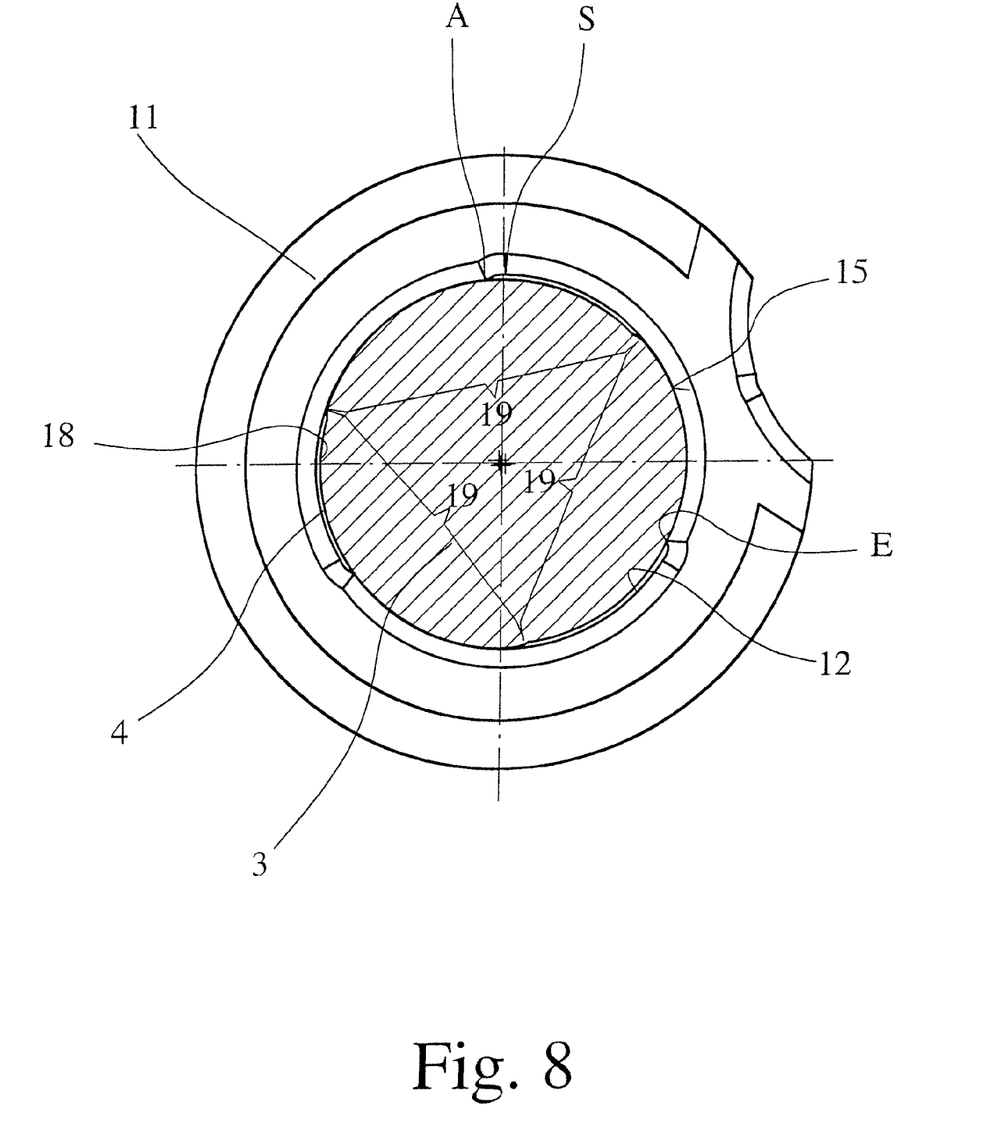
FIG. 8 shows the detail Z which is illustrated in FIG. 6 with an inserted centering bolt having a profile contour, which is matched to the profile of the clamping flange, in a frictional connection position, the centering bolt being illustrated in sectioned form.

FIG. 8 finally illustrates the detail Z from FIG. 4 with a centering bolt 3, which is inserted into the clamping flange 2, in the frictional connection position, the profile contour 18 of the centering bolt 3 being formed in the insertion region 5 by a plurality of arc portions 19 following one another in the circumferential direction X, and the arc portions 19 being formed in a complementary manner to the arc portions 13 of the inner contour 12 of the side wall of the clamping flange 2. This embodiment is distinguished by a very high holding force which is achieved when the centering bolt 3 and the clamping flange 2 are frictionally connected.

Figure 9:
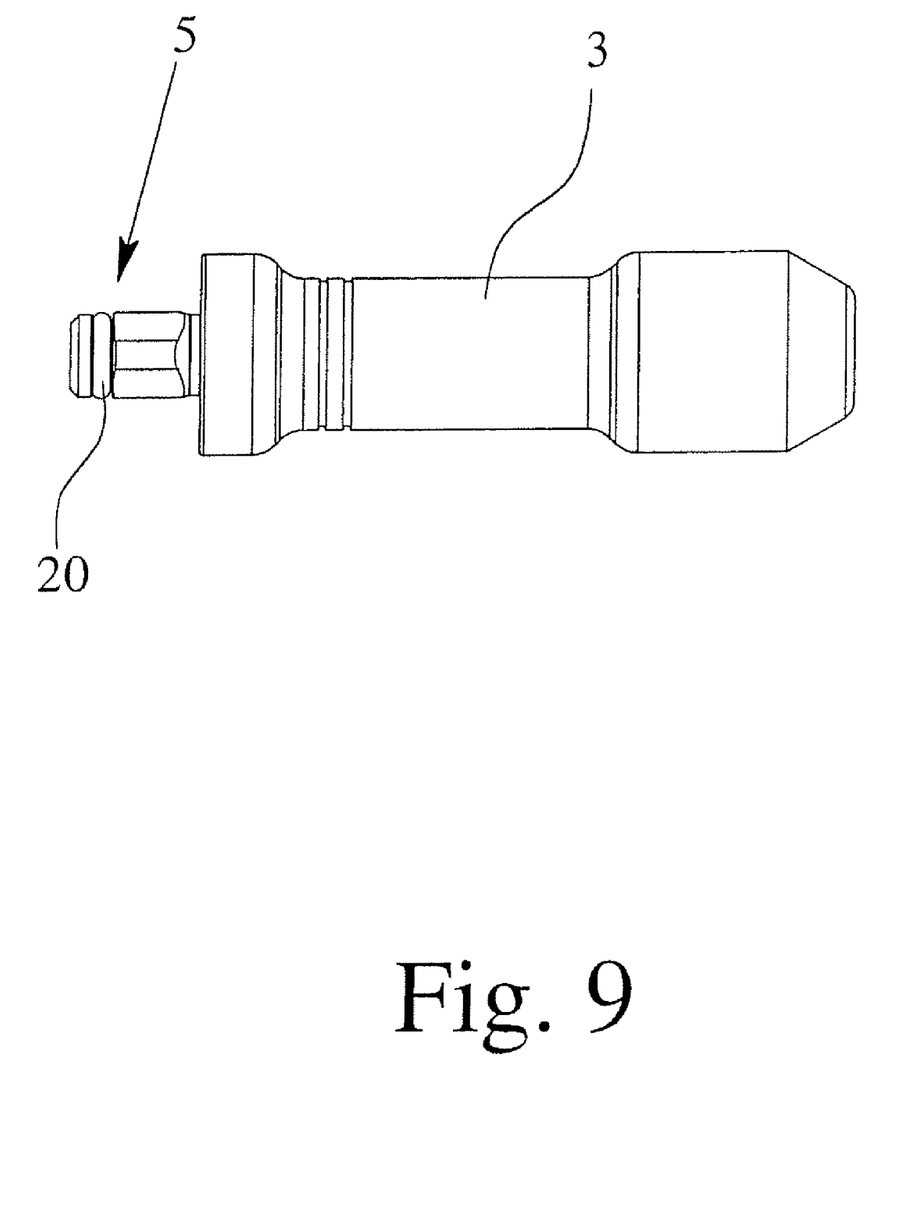
FIG. 9 shows a further embodiment of a centering bolt for the clamping device illustrated in FIG. 1.
Figure 10:
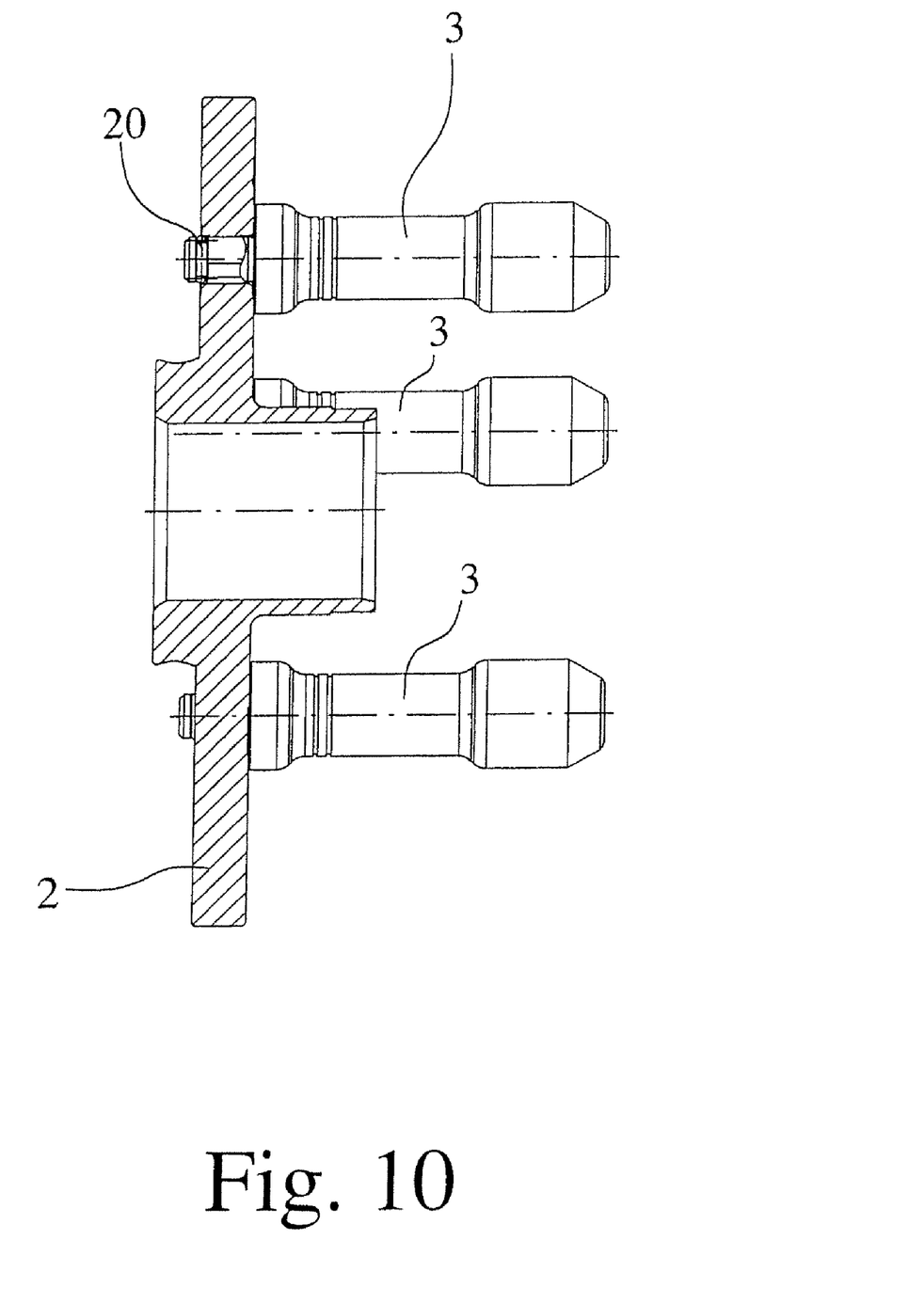
FIG. 10 shows a cross-sectional view of the clamping flange illustrated in FIG. 1 with a plurality of inserted centering bolts of the type illustrated in FIG. 9.

As can be seen from FIGS. 9 and 10, the centering bolt 3 can have a groove for an O ring 20 in the insertion region 5. After insertion into a recess 4 of the clamping flange 2, the centering bolt 3 is held captively on the clamping flange 2 by the O ring 20. The O ring 20 is intended merely to prevent the centering bolt 3 from falling out of the recess 4 if the centering bolt 3 has not yet been rotated into the frictional connection position.

What is claimed is:

1. Clamping device for clamping a vehicle wheel onto a shaft of a wheel balancing machine, comprising:
   a plurality of centering bolts, and
   a clamping flange with a plurality of recesses for receiving the centering bolts,
   wherein each centering bolt has an insertion region that is releasably insertable into said recesses,
   wherein the insertion region of the centering bolts and an inner contour of the clamping flange bounding each of the recesses are not circular, and are shaped in a complementary manner such that the insertion region is insertable into a recess with portions thereof being rotatably in the recess about a longitudinal axis of the insertion region, rotation of the centering bolt about the longitudinal axis thereof being able to produce a frictional connection between at least one surface portion of a circumferential surface of the centering bolt in the insertion region and at least one adjacent surface portion of the side wall bounding the recess, and wherein the circumferential surface of the centering bolt in the insertion region and the adjacent circumferential surface of the side wall of the clamping flange in the region of the recess have interacting run-on surfaces or run-on slopes which, by rotation of the centering bolt about the longitudinal axis thereof, enter into mutual engagement and ensure a frictional connection which acts in the axial and circumferential directions, between the centering bolt and the clamping flange after a predetermined angle of rotation has been reached.

2. Clamping device according to claim 1, wherein an angle of rotation of the centering bolt in the recess required in order to form a frictional connection is dependent on a state of wear of the surface portions forming the frictional connection.

3. Clamping device according to claim 1, wherein said angle of rotation of the centering bolt in a new state of the clamping device corresponds approximately to half of a maximum possible angle of rotation for forming a frictional connection in a worn state of the clamping device.

4. Clamping device according to claim 1, wherein the insertion region of the centering bolts has a polygonal profile.

5. Clamping device according to claim 1, wherein clamping flange has a central aperture about which said recess are disposed and which is configured to enable said clamping flange to be pushed onto the shaft of the wheel balancing machine and wherein said recesses are arranged in groups, the centering bolts being fewer in number than the recesses for insertion into only those recesses corresponding to the arrangement of holes in the rim of the vehicle wheel to be clamped.

6. Clamping device for clamping a vehicle wheel onto a shaft of a wheel balancing machine, comprising:
   a plurality of centering bolts, and
   a clamping flange with a plurality of recesses for receiving the centering bolts,
   wherein each centering bolt has an insertion region that is releasably insertable into said recesses,
   wherein the insertion region of the centering bolts and an inner contour of the clamping flange bounding each of the recesses are not circular, and are shaped in a complementary manner such that the insertion region is insertable into a recess with portions thereof being rotatable in the recess about a longitudinal axis of the insertion region, rotation of the centering bolt about the longitudinal axis thereof being able to produce a frictional connection between at least one surface portion of a circumferential surface of the centering bolt in the insertion region and at least one adjacent surface portion of the side wall bounding the recess; and wherein the inner contour of the side wall of the recesses is formed by a plurality of arc portions following one another in a circumferential direction, a distance between a center point of the recess and at least two points on the inner contour, which points are spaced apart from each other in a circumferential direction of an arc portion, differ in size.

7. Clamping device according to claim 6, wherein the distance between the center point of the recess and the inner contour decreases continuously in a circumferential direction over the length of each arc portion from a starting point on the inner contour at a greatest distance from the center point of the recess to an end point at a smallest distance from the center point of the recess in the region of an end of an arc.

8. Clamping device according to claim 6, wherein the distance between the center point of the recess and the inner contour increases continuously from a beginning point of one of the arc portions the starting point of a circumferentially next arc portion.

9. Clamping device according to claim 6, wherein all of the arc portions have the same arc profile.

10. Clamping device according to claim 6, wherein an end point of a first arc portion and a beginning point of a circumferentially next second arc portion are at the same distance from the center point of the recess.

11. Clamping device according to claim 6, wherein each arc portion is a circular arc in a region between a starting point and an end point, center points of the circular arcs being offset with respect to one another and with respect to the center point of the recess.

12. Clamping device according to claim 6, wherein the profile contour of the centering bolt in the insertion region is formed by a plurality of arc portions following one another in the circumferential direction, and wherein the arc portions of the profile contour of the centering bolt are complementary to the arc portions of the inner contour of the side wall of the recesses.

* * * * *